2,750,375

Patented June 12, 1956

2,750,375

POLYAZO-DYESTUFFS

Arthur Siebert, Richard Huss, and Josef Weissert, Frankfurt am Main, Germany, assignors to Farbwerke Hoechst Aktiengesellschaft vormals Meister Lucius und Bruning, Frankfurt am Main Hochst, Germany, a German company No Drawing. Application December 16, 1952,
Serial No. 326,342

Claims priority, application Germany December 24, 1951

7 Claims. (Cl. 260—166)

The present invention relates to poly-azo-dyestuffs; more particularly it relates to the poly-azo-dyestuffs corresponding to the following formula

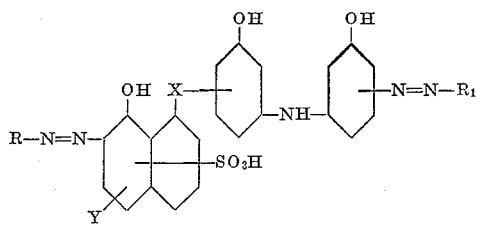

wherein R and $R_1$ represent aromatic radicals selected from the group consisting of radicals of the benzene, naphthalene and acenaphthene series at least one of which contains at least one sulfonic acid group, X stands for one of the groups —N=N— or

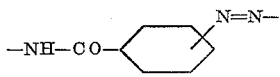

and Y represents hydrogen or the sulfonic acid group.

We have found that new and valuable poly-azo-dyestuffs corresponding to the following general composition

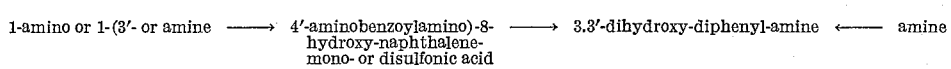

are obtained by coupling the mono-azo-dyestuff from a diazotized 1-amino-8-hydroxy-naphthalene-mono- or disulfonic acid or the 3′- or 4′-aminobenzoylamino derivative thereof and 3.3′-dihydroxy-diphenylamine with 2 mols of any aromatic diazo-compound of the benzene, naphthalene or acenaphthene series which together must contain at least one sulfonic acid group.

Azo-dyestuffs of the composition indicated above can also be obtained in the following manner:

(a) A diazotized aromatic amine of the benzene, naphthalene or acenaphthene series is coupled in an alkaline medium with a 1-amino-8-hydroxy-naphthalene-mono- or disulfonic acid, the amino-azo-dyestuff obtained is diazotized again, coupled with 3.3′-dihydroxy-diphenyl-amine and the disazo-dyestuff so obtained is then combined with a diazotized aromatic amine of the benzene, naphthalene or acenaphthene series, or (b) A diazotized aromatic amine of the benzene, naphthalene or acenaphthene series is coupled with 3.3′-dihydroxy-diphenylamine, the mono-azo-dyestuff obtained is coupled with a diazotized 1-amino-8-hydroxy-naphthalene-mono- or disulfonic acid and the disazo-dyestuff so obtained is combined with a diazotized aromatic amine of the benzene, naphthalene or acenaphthene series, or (c) The mono-azo-dyestuff from a diazotized aromatic amine of the benzene, naphthalene or acenaphthene series and 3.3′-dihydroxy-diphenylamine is coupled with the diazo-compound of the amino-mono-azo-dyestuff obtainable by coupling a diazotized aromatic amine of the benzene, naphthalene or acenaphthene series in an alkaline medium with a 1-amino-8-hydroxy-naphthalene-mono- or disulfonic acid.

The two aromatic amines used must be so selected that at least one of the amines contains at least one sulfonic acid group. Instead of 1-amino-8-hydroxy-naphthalene-mono- or disulfonic acid there may be used the corresponding 3′- or 4′-amino-benzoylamino derivatives.

The dyestuffs obtainable by this invention are very readily soluble in water and resistant to inorganic and organic acids. They are also insensitive to alkalies and formaldehyde. The new products are distinguished by an especially high colouring strength, if the aromatic amines used are substituted by one or two nitro groups. They have a high affinity for leather fibers and dye chrome-tanned leather or leather tanned with vegetable and synthetic tanning agents, by drum dyeing, brush dyeing or spray dyeing, in general deep brown tints of a good fastness to light.

The following examples illustrate the invention, but they are not intended to limit it thereto; the parts being by weight unless otherwise stated, and the relationship of parts by weight to parts by volume being the same as that of the kilogram to the liter:

Example 1

20.1 parts of 3.3′-dihydroxy-diphenylamine are dissolved in 200 parts by volume of water and 20 parts by volume of 10 N-sodium hydroxide solution. The diazo-suspension from 34.1 parts of 1-amino-8-hydroxy-naphthalene-3.6-disulfonic acid (mono-sodium salt) is then slowly added, while cooling. By the simultaneous addition of 20–24 parts by volume of 10 N-sodium hydroxide solution the pH-value of the coupling medium is maintained at 10. When the coupling is complete, the whole quantity of the diazo-suspension from 17.3 parts of 1-aminobenzene-4-sulfonic acid is added, and 200 parts by volume of 2 N-sodium hydroxide solution are then slowly introduced. The coupling mixture is stirred for one night. After the addition of 20 parts of crystallized sodium acetate, the aqueous, clarified diazo-solution from 17.3 parts of 1-amino-2-chloro-4-nitrobenzene is then added dropwise in the course of 45 minutes.

The coupling medium shows an acetic acid reaction. After stirring has been continued for 2 hours, the trisazo-dyestuff is precipitated with common salt, filtered with suction and dried. The black-brown powder obtained readily dissolves in water and dyes leather tanned by various processes reddish dark-brown tints which are distinguished by a very good fastness to light, a good covering power and good general fastness properties. The new dyestuff corresponds to the following formula:

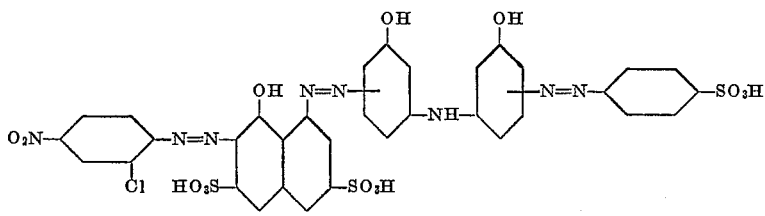

Dyestuffs dyeing leather similar dark brown tints are obtained by substituting 1-amino-2-methyl-3-chlorobenzene-5-sulfonic acid, 1-aminobenzene-2.5-disulfonic acid, 5-amino-acenaphthene-3(8)-sulfonic acid or 4-amino-diphenylamine-2-sulfonic acid for 1-aminobenzene-4-sulfonic acid for 1-aminobenzene-4-sulfonic acid and 1-amino-4-nitrobenzene for 1-amino-2-chloro-4-nitrobenzene.

*Example 2*

If in Example 1 30.9 parts of 4-amino-4′-nitrodiphenylamine-2′-sulfonic acid are used instead of 1-aminobenzene-4-sulfonic acid and the final coupling is likewise carried out at a pH-value of 10, by adding dropwise at the same time the aqueous diazo solution of 17.3 parts of 1-amino-2-chloro-4-nitrobenzene and 150 parts by volume of 5 N-sodium hydroxide solution, there is obtained, after acidifying the solution to attain a pH of 4, salting out, filtering with suction and drying, a trisazo-dyestuff which is readily soluble in water and yields on all kinds of leather a very deep yellowish dark-brown dyeing of very good fastness to light, very good general fastness properties and a very good covering power.

*Example 3*

The diazo compound from 19.9 parts of 1-amino-2-hydroxy-3.5-dinitrobenzene is combined in an alkaline medium with 34.1 parts of 1-amino-8-hydroxy-naphthalene-3.6-disulfonic acid (monosodium salt). When the coupling is complete, the alkaline solution is mixed with 13.1 parts by volume of a sodium nitrite solution of 40 per cent. strength and the amino-azo-dyestuff is readily diazotized at 5° C. by pouring in 150 parts by volume of 5 N-hydrochloric acid. After stirring has been continued for 2 hours, the solution of 20.1 parts of 3.3′-dihydroxy-diphenylamine in 200 parts by volume of water and 20 parts by volume of 10 N-sodium hydroxide solution are quickly added and finally such a quantity of 10 N-sodium hydroxide solution until the pH has attained a value of 10–11. When the coupling is complete, the diazo-suspension from 30.9 parts of 4-amino-4′-nitro-diphenylamine-2′-sulfonic acid and the corresponding quantity of 2 N-sodium hydroxide solution are simultaneously added in the course of 15 minutes so that the coupling medium is maintained at a pH of 10–11. After stirring has been continued for 2 hours, the mixture is rendered acid to acetic acid and the trisazo-dyestuff is precipitated with common salt, filtered with suction and dried. The black-brown powder dyes leather, tanned by various processes, by drum dyeing, brush-dyeing and spray dyeing very deep dark-brown tints of very good fastness to light, excellent covering power and very good fastness to acids, alkalies and formaldehyde.

*Example 4*

The diazo-suspension from 22.3 parts of 1-aminonaphthalene-6-(7)-sulfonic acid (mixture of Cleve's acids) is combined at a pH-value of 10 with 20.1 parts of 3.3′-dihydroxy-diphenylamine. To the mono-azo-dyestuff so obtained are slowly added the diazo-suspension from 34.1 parts of 1-amino-8-hydroxy-naphthalene-3.6-disulfonic acid and such a quantity of 2 N-sodium hydroxide solution that the pH-value of 10 is maintained. While keeping this pH-value, the disazo-dyestuff obtained is combined with the diazo-solution of 26.4 parts of 4-amino-diphenylamine-2-sulfonic acid. When the coupling is complete, the mixture is acidified with 80 parts by volume of 5 N-hydrochloric acid and the dyestuff is isolated in the usual manner. The black-brown powder so obtained dyes chrome-tanned leather and leather tanned with vegetable or synthetic tanning agents, by various methods of dyeing, very deep dark-brown tints of a violet hue which are distinguished by a very good fastness to light, an excellent covering power and very good fastness to acids, alkalies and formaldehyde.

*Example 5*

The diazo suspension from 17.3 parts of 1-aminobenzene-4-sulfonic acid is coupled in an alkaline medium with 23.9 parts of 1-amino-8-hydroxy-naphthalene-4-sulfonic acid. When the coupling is complete, the alkaline solution of the amino-monoazo-dyestuff so obtained is mixed with 20 parts by volume of 5 N-sodium nitrite solution and the mixture is rendered acid to Congo paper by introducing 120 parts by volume of 5 N-hydrochloric acid. The diazotization takes place quickly and without any difficulties. The diazo-azo-compound thus obtained is combined in a strongly alkaline medium with the mono-azo-dyestuff obtained by coupling in a strongly alkaline medium the diazo compound from 30.9 parts of 4-amino-4′-nitro-diphenylamine-2′-sulfonic acid with 20.1 parts of 3.3′-dihydroxy-diphenylamine, and the trisazo-dyestuff obtained is separated in known manner. It readily dissolves in water and dyes chrome-tanned leather and leather tanned with vegetable or synthetic tanning agents deep dark brown tints of good fastness properties and an excellent covering power.

If in the above example 1-amino-8-hydroxy-naphthalene-4-sulfonic acid is replaced by 1-amino-8-hydroxy-naphthalene-5-sulfonic acid, a dyestuff of similar properties is obtained.

*Example 6*

341 parts of 1-amino-8-hydroxy-naphthalene-3.6-disulfonic acid are diazotized in the usual manner and the yellow diazo suspension is mixed with 120 parts of glacial acetic acid. A solution of 201 parts of 3.3′-dihydroxy-diphenylamine in 1000 parts of water and 200 parts by volume of 10 N-sodium hydroxide solution is then slowly added dropwise to the diazo suspension so obtained. The coupling is terminated in an acetic acid reaction within 15 hours. The diazo suspension from 618 parts of 4-amino-4′-nitrodiphenylamine-2′-sulfonic acid is then introduced into the mono-azo-dyestuff and finally so many parts by volume of sodium hydroxide solution are slowly added that the coupling is complete at a pH-value of 10. After the coupling medium has been adjusted to an acetic acid reaction, the trisazo-dyestuff is precipitated with common salt, filtered with suction and dried. The black-brown powder obtained readily dissolves in water and dyes leather tanned by various processes covered dark-brown tints of very good fastness to light and good general fastness properties.

In the following table are given a number of other azo-dyestuffs of this invention which dye leather similar tints and impart to leather the same good fastness properties:

and Y stands for a member of the group consisting of hydrogen and the sulfonic acid group.

|  | Constitution | Tint |
|---|---|---|
| (1) | 1-amino-2-chloro-4-nitrobenzene → 1-(4'-aminobenzoyl-amino)-8-hydroxy-naphthalene-3.6-disulfonic acid → 3.3'-dihydroxy-4-amino-4'-nitrodiphenylamine-2'-sulfonic acid → diphenylamine. | red-brown. |
| (2) | 1-amino-2-chloro-4-nitrobenzene → 1-(3'-aminobenzoyl-amino)-8-hydroxy-naphthalene-3.6-disulfonic acid → 3.3'-dihydroxy-4-amino-4'-nitrodiphenylamine-2'-sulfonic acid → diphenylamine. | Do. |
| (3) | 1-amino-2-chloro-4-nitrobenzene → 1-amino-8-hydroxy-naphthalene-4.6-disulfonic acid → 3.3'-dihydroxy-4-amino-4'-nitrodiphenylamine-2'-sulfonic acid → diphenylamine. | deep reddish dark-brown. |
| (4) | 4-amino-2'.4'-dinitro-diphenyl-amine-6'-sulfonic acid → 1-amino-8-hydroxy-naphthalene-3.6-disulfonic acid → 3.3'-dihydroxy-1.4-diaminobenzene-2-sulfonic acid → diphenylamine. | deep dark-brown. |
| (5) | 1-amino-4-nitro-benzene-2-sulfonic acid → 1-amino-8-hydroxy-naphthalene-3.6-disulfonic acid → 3.3'-dihydroxy-1 amino-4-nitrobenzene-2-sulfonic acid → diphenylamine. | bluish dark-brown. |
| (6) | 4-amino-4'-nitro-diphenylamine-2'-sulfonic acid → 1-amino-8-hydroxy-naphthalene-3.6-disulfonic acid → 3.3'-dihydroxy-4-amino-1.1'-azobenzene-4'-sulfonic acid → diphenylamine. | deep dark-brown. |
| (7) | 4-amino-1.1'-azo-benzene-4'-sulfonic acid → 1-amino-8-hydroxy-naphthalene-3.6-disulfonic acid → 3.3'-dihydroxy-4-amino-4'-nitrodiphenylamine-2'-sulfonic acid → diphenylamine. | Do. |

We claim:
1. Poly-azo-dyestuffs corresponding to the following general formula

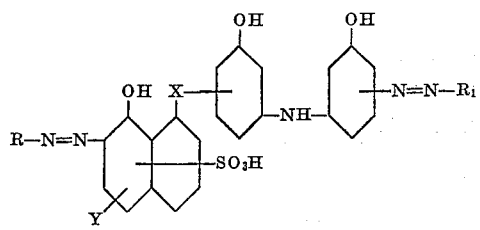

wherein R and $R_1$ represent aromatic radicals selected from the group consisting of radicals of the benzene, naphthalene and acenaphthene series, at least one of which contains one sulfonic acid group, X stands for one of the groups consisting of —N=N— and

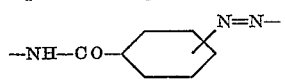

2. Poly-azo-dyestuffs corresponding to the following general formula

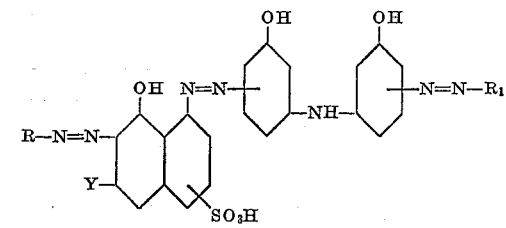

wherein R and $R_1$ represent aromatic radicals selected from the group consisting of radicals of the benzene, naphthalene and acenaphthene series, at least one of which contains one sulfonic acid group and Y stands for a member of the group consisting of hydrogen and the sulfonic acid group.

3. The poly-azo-dyestuff corresponding to the following formula

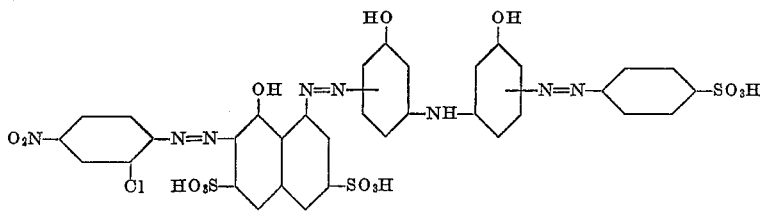

4. The poly-azo-dyestuff corresponding to the following formula

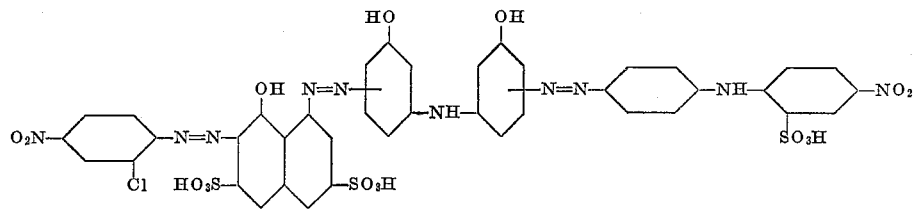

5. The poly-azo-dyestuff corresponding to the following formula

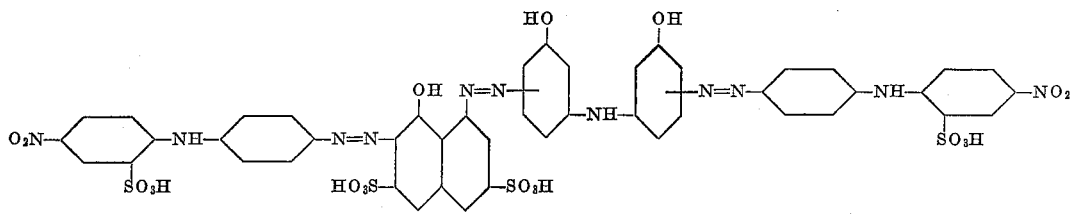

6. The poly-azo-dyestuff corresponding to the following formula
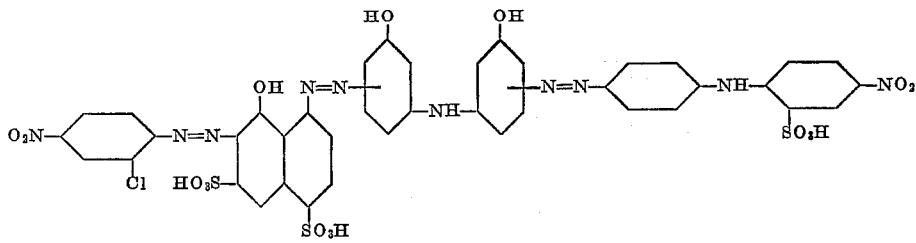
7. The poly-azo-dyestuff corresponding to the following formula
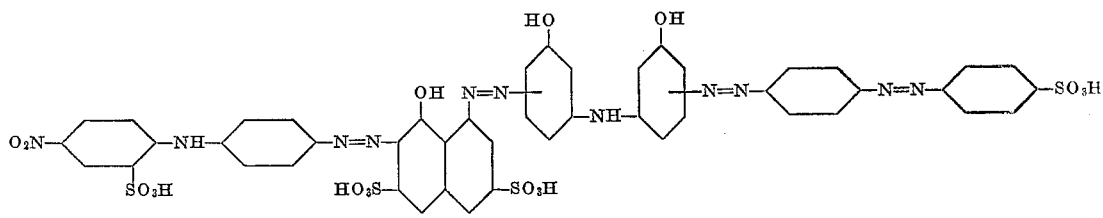
References Cited in the file of this patent
UNITED STATES PATENTS
| | | |
|---|---|---|
| 1,947,945 | Lange | Feb. 20, 1934 |
| 2,322,746 | Rossander | June 29, 1943 |
FOREIGN PATENTS
| | | |
|---|---|---|
| 215,050 | Switzerland | Sept. 1, 1941 |